(12) United States Patent
Nam et al.

(10) Patent No.: US 7,751,302 B2
(45) Date of Patent: Jul. 6, 2010

(54) INFORMATION MEDIA AND METHOD AND APPARATUS FOR WRITING AND REPRODUCING INFORMATION USING THE SAME

(75) Inventors: Yun-woo Nam, Yongin-si (KR); Dong-ki Min, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 882 days.

(21) Appl. No.: 11/633,472

(22) Filed: Dec. 5, 2006

(65) Prior Publication Data
US 2007/0196618 A1  Aug. 23, 2007

(30) Foreign Application Priority Data
Feb. 20, 2006  (KR) ................ 10-2006-0016226

(51) Int. Cl.
*G11B 3/70* (2006.01)
*G11B 9/00* (2006.01)

(52) U.S. Cl. .................. 369/276; 369/126; 369/13.38

(58) Field of Classification Search ............... 369/276, 369/126, 277, 283, 275.1, 275.4, 13.38, 13.29, 369/47.5, 47.53, 47.28, 53.26, 13.11; 428/64.4
See application file for complete search history.

(56) References Cited

U.S. PATENT DOCUMENTS 3,256,481 A  6/1966  Pulvari 6,521,921 B2  2/2003  Lim et al.
7,149,180 B2 * 12/2006  Onoe et al. ............. 369/276
2002/0008304 A1  1/2002  Lim et al.

FOREIGN PATENT DOCUMENTS

| EP | 1394789 A2 | 3/2004 |
|---|---|---|
| JP | 1996-297870 | 11/1996 |
| JP | 2005-158248 A | 6/2005 |
| KR | 10-0366701 B1 | 12/2002 |
| KR | 2003-42580 A | 6/2003 |
| WO | WO 03/096409 A1 | 11/2003 |

* cited by examiner

*Primary Examiner*—Ali Neyzari
(74) *Attorney, Agent, or Firm*—Sughrue Mion, PLLC

(57) ABSTRACT

Provided are a method and an apparatus for reproducing information using a semiconductor probe. The apparatus includes a storage media including a ferroelectric recording layer which stores information by arranging a polarization direction of polarization domains of the ferroelectric recording layer and a physical recording layer disposed on the ferroelectric recording layer and whereupon information is written by forming pits in the physical recording layer, a semiconductor probe generating a composite signal including an electric field signal generated by an electric field variation of the ferroelectric recording layer of the storage media and a thermal signal generated by a temperature variation generated due to a variation in a shape of the physical recording layer, a signal detector detecting the composite signal from the semiconductor probe, and a demodulator demodulating the composite signal from the signal detector and extracting the electric field signal and the thermal signal from the composite signal.

22 Claims, 11 Drawing Sheets

INFORMATION MEDIA AND METHOD AND APPARATUS FOR WRITING AND REPRODUCING INFORMATION USING THE SAME

CROSS-REFERENCE TO RELATED PATENT APPLICATIONS

This application claims priority from Korean Patent Application No. 10-2006-0016226, filed on Feb. 20, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to reproducing information using a field effect semiconductor probe, and more particularly, to reproducing information in which a thermal signal generated by the surface structure of media and an information signal generated by a variation in an electric field of the media can be separated from each other.

2. Description of the Related Art

As the demand for small-sized products such as portable communication terminals and electronic pocketbooks increases, highly-integrated micro nonvolatile recording media are increasingly required. It is not easy to reduce the size of existing hard disks and to highly integrate flash memories at low cost. Thus, an information storage media and a method using a scanning probe have been studied as a possible alternative.

The scanning probe is used in various types of scanning probe microscopes (SPMs). For example, the scanning probe is used in a scanning tunneling microscope (STM), an atomic force microscope (AFM), a magnetic force microscope (MFM), a scanning near-field optical microscope (SNOM), an electrostatic force microscope (EFM), and the like. The STM detects a current flowing through a probe based on a difference between voltage applied to the probe and a sample to reproduce information. The AFM uses an atomic force between a probe and a sample. The MFM uses a magnetic force between a magnetic field near the surface of a sample and a magnetized probe. The SNOM has an improved resolution less than the wavelength of visible light. The EFM uses an electrostatic force between a sample and a probe.

Lim et al. suggests a field effect probe for detecting a surface charge of media using a field effect (see U.S. Pat. No. 6,521,921 and Korean Patent No. 0366701). The probe suggested by Lim et al. has a semiconductor tip in a field effect transistor shape in which a carrier channel is formed by an electric field. The electric field applied to the semiconductor tip is formed by charges or a dipole moment trapped on the surface of the media. When the charge trapped on the disk corresponding to written information forms an electric field having strength greater than a threshold field strength, a channel is formed and the resistance of a field effect probe is reduced. Thus, information written using a variation in a resistance corresponding to the written information can be reproduced.

In addition, Park et al. who are also the inventors of the present application suggest a resistive semiconductor probe in which a channel region of the semiconductor tip is lightly doped (see U.S. Patent Application Publication No. 2005/0231225 A1). The semiconductor tip of the resistive semiconductor probe is lightly doped with impurities so that a weak current can flow even without an electric field present. Thus, the semiconductor tip can be detected even in a weak electric field. That is, a method suggested by Park et al. guarantees high sensitivity to a charge even in a weak electric field by providing low electron mobility in which a carrier moves even in a non-electric field to the semiconductor tip.

However, the resistive semiconductor tip is sensitive to heat. Thus, a resistance thereof varies according to temperature. A variation in a resistance caused by thermal instability appears as a defect of the resistive semiconductor probe. That is, a variation in unstable temperature of the probe causes an unstable current variation which is a noise current in the resistive semiconductor tip. The noise current is generated by a variation in temperature regardless of an electric field. An unstable temperature variation in the resistive semiconductor probe is generated because heat generated in a probe or a cantilever supporting the probe is not uniformly and continuously dissipated by an unstable variation in a distance between media and a probe or a contact area.

In order to suppress an unstable variation in the temperature of the resistive semiconductor probe, the distance between the probe and the media should be maintained. To this end, the surface of the media that faces the probe may be made to be very smooth. Even though the smoothness of the surface of the media is maximized, it is not possible to obtain sufficient and effective thermal stability due to a limit of achievable smoothness. This is because, even when the distance between the media and the probe varies within the range of several nm, a noise current is generated by a variation in temperature and even when the surface of the media is processed to be smooth, like a mirror, the smoothness of the surface of the media cannot be adjusted within the range of several nm. As another alternative, the distance between the probe and the media may be sufficiently large. The feasibility of the alternative is low since it is difficult to manufacture a resistive semiconductor probe having a high aspect ratio. There is almost no possibility of a noise current caused by thermal instability being entirely eliminated even in the semiconductor probe suggested by Lim et al.

Accordingly, a method for effectively reproducing a signal in spite of a noise current caused by thermal instability of a semiconductor probe by improving a signal-to-noise (S/N) ratio is desired, so as to effectively read information from media on which information is written using a charge, using a semiconductor probe in which the flow of current is controlled by a field effect.

An information writing/reproducing method by which the information is represented by a variation in the shape of the surface of a disk has been suggested (William P. King et al., Volume 78, Number 9, Applied Physics letters, 26 Feb. 2001). In this technology, a data bit is formed on a thin film on a media by thermally melting the surface of the disk using a probe in order to write information on the media. When information is reproduced from the media, a variation in the resistance of or current in a cantilever is detected using a variation in the amount of heat dissipation according to a variation in a distance between the cantilever and the surface of the media due to a variation in the shape of a substrate which represents the bits of information.

One aspect of development of storage technology is to maximize the density of written information. To this end, the development of new media for maximizing the density of written information is required and an apparatus for writing/reproducing information that can support the development of the new media is also needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of writing/reproducing information by which the writing density of information can be increased, a new storage media used in the method, and an apparatus for writing and reproducing information using the new storage media.

According to an aspect of the present invention, there is provided an information storage media, the information storage media including: a substrate; a ferroelectric recording layer in which information is stored by arranging the polarization direction of polarization domains of the ferroelectric recording layer, and formed on the substrate; a physical recording layer which is disposed on the ferroelectric recording layer and on which information is written by forming pits in the physical recording layer; and an electrode positioned between the substrate and the ferroelectric recording layer.

According to another aspect of the present invention, there is provided an apparatus for reproducing information, the apparatus including: a storage media including a ferroelectric recording layer in which information is stored by arranging the polarization direction of polarization domains of the ferroelectric recording layer and a physical recording layer which is disposed on the ferroelectric recording layer and on which information is written by forming pits in the physical recording layer; a semiconductor probe generating a composite signal including an electric field signal generated by an electric field variation of the ferroelectric recording layer of the storage media and a thermal signal generated by a temperature variation generated due to a variation in the shape of the physical recording layer; a signal detector detecting the composite signal generated by the semiconductor probe; and a demodulator demodulating the composite signal detected by the signal detector and extracting the electric field signal and the thermal signal from the composite signal.

The apparatus may further include: a high frequency modulation signal generator; and an electrode which is disposed on the cantilever and to which a high frequency modulation signal is applied by the high frequency modulation signal generator, wherein the semiconductor probe may include: a tip formed of a p-type semiconductor; a region on which a channel is to be formed at the point of the tip; source and drain regions doped to be an n-type semiconductor on slanting surfaces of either sides of the region on which the channel is to be formed; and a cantilever disposed on an end of the tip and formed of a p-type semiconductor. The channel region may be doped to be an n-type semiconductor with a lower concentration than that of the source and drain regions.

The high frequency modulation signal may be a sinusoidal signal. The high frequency modulation signal may be a high frequency signal having a frequency at least 5 times larger than a frequency of an electric field generated in the storage media.

The demodulator may include: a first multiplier, which is a multiplication operator, multiplying the composite signal detected by the signal detector by a demodulation signal; a first low pass filter extracting an electric field signal having a frequency less than a predetermined frequency from a primary signal output from the first multiplier; a second multiplier multiplying the primary signal by the demodulation signal; and a second low pass filter extracting a thermal signal having a frequency less than a predetermined frequency from a secondary signal output from the second multiplier, wherein the demodulation signal has substantially the same frequency as a frequency of the high frequency modulation signal and has substantially the same phase as that of the composite signal detected by the signal detector. A cut-off frequency of the low pass filter may be less than 10 times than the frequency of the modulation signal.

The signal detector may be configured as a voltage divider so as to distribute and apply a voltage to the semiconductor probe and to extract a signal. The voltage divider may be a bridge circuit comprising at least one resistor and the semiconductor probe or may be an inversion amplifier including at least one resistor and an operational amplifier in which a feedback loop is formed using the semiconductor probe. The bridge circuit may further include a differential amplifier so as to remove an offset voltage generated by the voltage divider.

According to another aspect of the present invention, there is provided a method of reproducing information written on storage media using a semiconductor probe comprising a storage media comprising a ferroelectric recording layer in which information is stored by arranging the polarization direction of polarization domains of the ferroelectric recording layer and a physical recording layer which is disposed on the ferroelectric recording layer and on which information is written by forming pits in the physical recording layer and a semiconductor tip detecting information from the first and second recording layers of the media, the method including: modulating an electric field signal generated by an electric field variation of the ferroelectric recording layer of the storage media by applying a high frequency modulation signal to the semiconductor probe and by forming a modulation field; detecting a composite signal corresponding to the information from the semiconductor probe; and demodulating the modulated electric field signal and a non-modulated thermal signal by separating the modulated electric field signal and the non-modulated thermal signal from each other and by extracting two signals.

The demodulating may include: multiplying the detected composite signal by a demodulation signal; extracting an electric field signal having a frequency less than a predetermined frequency from a primary signal output from the multiplying of the composite signal; multiplying the primary signal by the demodulation signal; and extracting a thermal signal having a frequency less than a predetermined frequency from a secondary signal output from the multiplying of the primary signal. The demodulation signal may have substantially the same frequency as a frequency of the modulation signal and may have substantially the same phase as that of the detected composite signal.

The detecting may include distributing a voltage to the semiconductor probe and extracting a signal generated in the semiconductor probe. The detecting may further include removing and amplifying an offset voltage of the distributed voltage.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE EXEMPLARY EMBODIMENTS OF THE INVENTION

Hereinafter, the present invention will be described more fully with reference to the accompanying drawings, in which exemplary embodiments of the invention are shown.

Figure 1A:
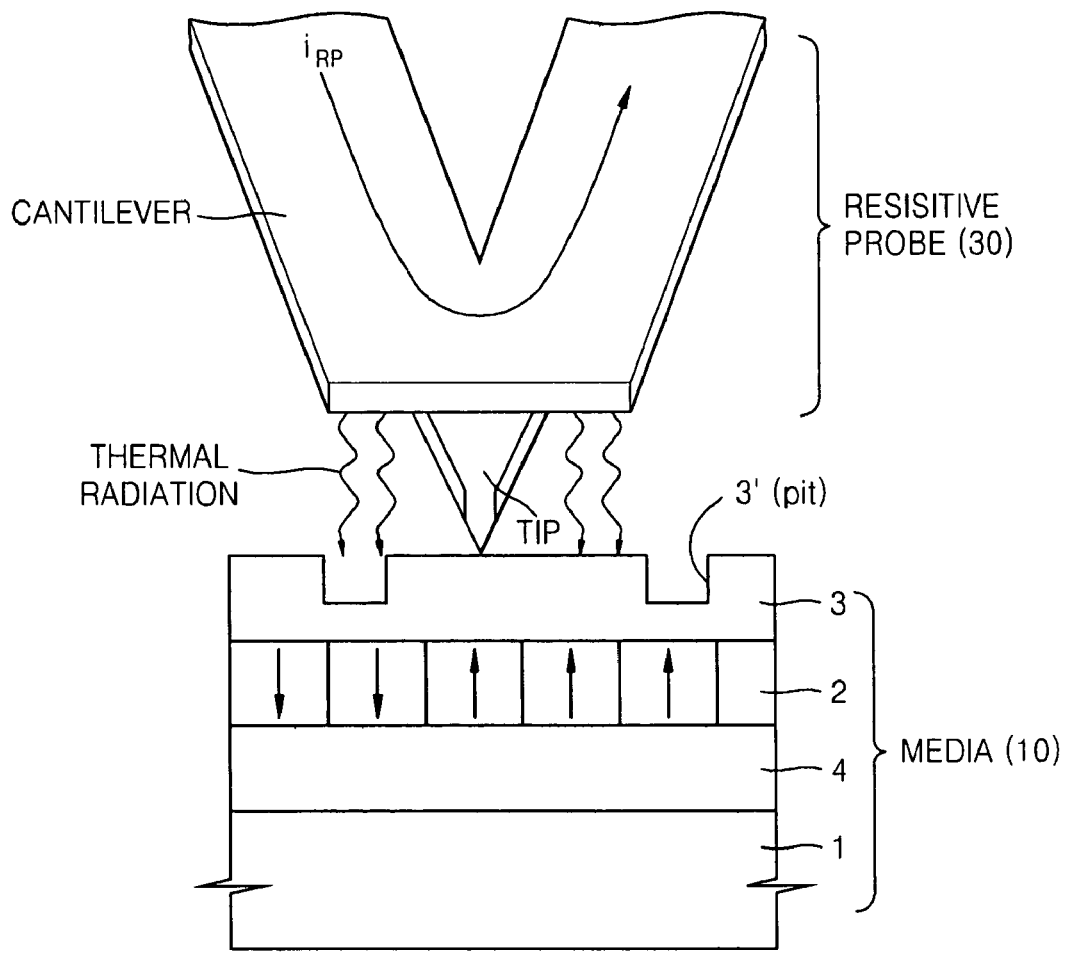
FIG. 1A illustrates the relationship between a related art field effect semiconductor probe and an information storage media according to an exemplary embodiment of the present invention.

FIG. 1A illustrates the relationship between a related art field effect semiconductor probe and an information storage media according to an exemplary embodiment of the present invention. As schematically shown in FIG. 1A, a resistive probe 30 includes a cantilever and a field effect transistor type semiconductor tip disposed on a front end of the cantilever to face the surface of the media. The media 10 according to an exemplary embodiment of the present invention includes a ferroelectric recording layer 2 in which information is stored in a polarization domain having a variation in an electric field, a physical recording layer 3 on which information is written by a pit 3' inducing a variation in heat dissipation, and an electrode 4 formed below the ferroelectric recording layer 2. The physical recording layer 3 is formed on the ferroelectric recording layer 2 and directly contacts the field effect transistor type semiconductor tip. Here, a well-known material may be used for the media 10. For example, the electrode 4 may be formed of one material selected from the group consisting of Pt, Pd, Ir, Ru, and RuO$_2$, the ferroelectric recording layer 2 may be formed of one material selected from the group consisting of PZT, PbTiO$_3$, BiFeO$_3$, and LiTaO$_3$, and the physical recording layer 3 may be formed of one material selected from the group consisting of polystyrene benzylcyclobutene (PS-BCB), PCBM [6,6]-phenul C61-butyric acid methyl ester), OC1C10-PPV (poly[2-methoxy-5-(3', 7'-dimethyloctyloxy)]-p-phenylene vinylene), and poly-3-hexylhtiophene (P3HT).

The operation of writing information on media will now be described.

Figure 1B:
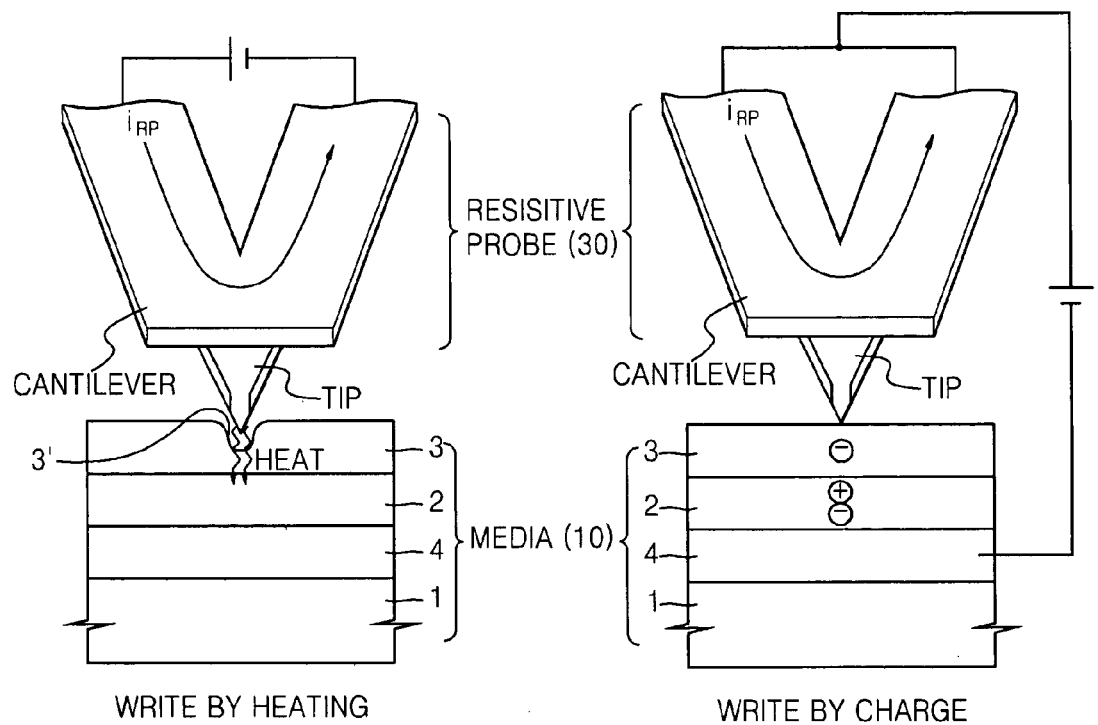
FIG. 1B illustrates writing methods by heating and charging using the related art field effect semiconductor probe.

First, as shown in FIG. 1B, a predetermined voltage is applied between the resistive probe 30 and the electrode 4 so as to write information on the ferroelectric recording layer 2 so that charge injection in a physical recording layer formed of a dielectric material occurs. As such, a polarized dipole corresponding to information to be recorded is generated to be perpendicular to the ferroelectric recording layer 2.

Referring to FIG. 1B, a predetermined voltage is applied between both ends of the resistive probe 30 to induce heat dissipation in a tip, so as to write information on the upper physical recording layer 3. The heated tip contacts the physical recording layer 3 with an appropriate pressure. Thus, melting occurs in a portion where the tip contacts the physical recording layer 3 and a pit 3' is formed.

The operation of reading information from the media on which information is written in the above-described form will now be described.

First, when information is read from the physical recording layer 3, heat generated in the cantilever is dissipated toward the media 10. In this case, a variation in a distance between the media 10 and the resistive probe 30 occurs due to one of the pits 3' of the physical recording layer 3 corresponding to written information. Thus, a thermal resistance variation in the cantilever and the semiconductor tip fixed therein occurs due to a variation in thermal radiation. When the information is read from the ferroelectric recording layer 2, a variation in an electric field of the resistive semiconductor tip occurs due to a charge trapped by a polarization domain formed on the ferroelectric layer 2 in the physical recording layer 3 and a variation in an electrical resistance caused by the variation in the electric field of the resistive semiconductor tip occurs. A current $i_{RP}$ in the whole resistive probe 30 varies due to a variation in composite resistance by heat and an electric field. The current $i_{RP}$ is detected as an output $V_o$ of the resistive probe 30, and a thermal signal and an electric field signal are separated out of the detected output $V_o$ using an apparatus for reproducing information which will be described later.

Figure 1C:
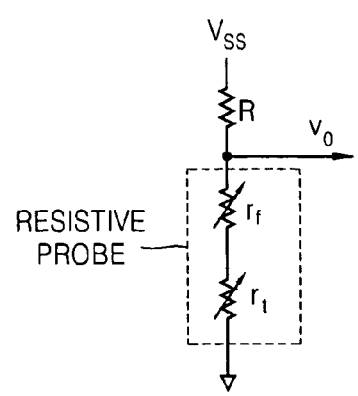
FIG. 1C is an equivalent circuit of a resistive probe.

FIG. 1C is an equivalent circuit of a resistive probe in which the above-described thermal resistance $r_t$ and a resistance $r_f$ that varies due to an electric field are considered in a signal detector which is configured as a voltage divider. That is, a resistance $r_{RP}$ of the resistive probe is expressed as $r_{RP}=R_o+r_f+r_t$, where $R_o$ is a resistance component when there is no electric field and no thermal variation in the resistive probe. According to the equivalent circuit, the output $V_o$ is obtained using equation 1:

$$v_o = \frac{r_{RP}}{R+r_{RP}} V_{ss} \qquad (1)$$
$$= \frac{R_o+r_f+r_t}{R+R_o+r_f+r_t} V_{ss}$$
$$\approx \frac{R_o+r_f+r_t}{R+R_o} V_{ss}$$

A variation in the thermal resistance $r_t$ and the resistance $r_f$ that varies due to an electric field affect the output $V_o$. According to an exemplary embodiment of the present invention, a thermal signal generated by a variation in the thermal resistance included in the output $V_o$ and the electric field signal generated by a variation in an electric field are separated and are used as reproduction signals.

An information reproducing method according to the present invention will now be described with reference to an apparatus for reproducing information according to an exemplary embodiment of the present invention which will be described later.

Figure 2A:
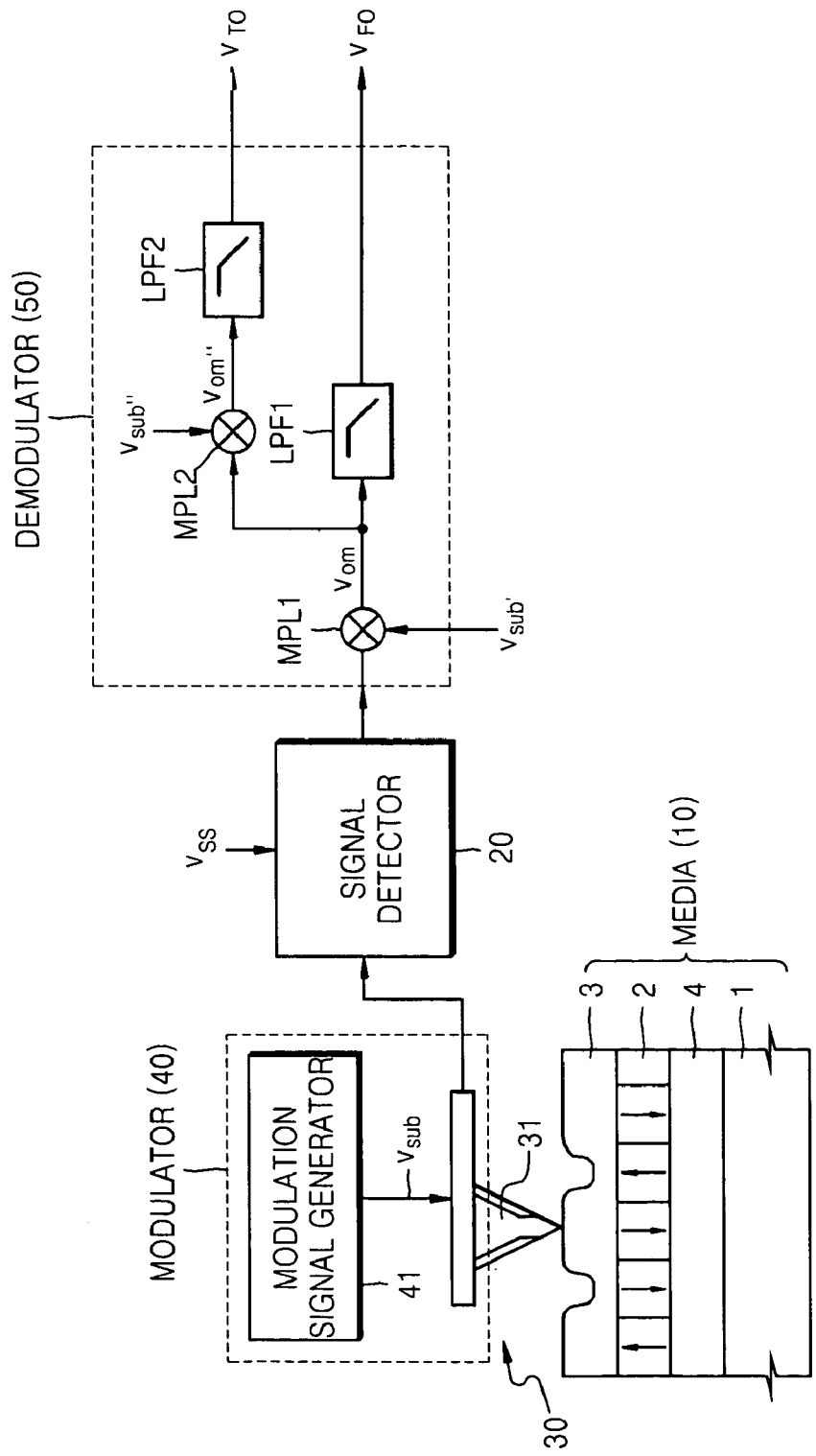
FIG. 2A is a schematic diagram of an apparatus for reproducing information according to an exemplary embodiment of the present invention.

FIG. 2A is a schematic diagram of an apparatus for reproducing information according to an exemplary embodiment of the present invention.

Referring to FIG. 2A, a resistive probe 30 having a semiconductor tip 31 is disposed on the surface of media 10 having double recording layers 2 and 3 for storing information using a polarization domain, at predetermined intervals. An output from the resistive probe 30 is connected to a signal detector 20, and the signal detector 20 is connected to a demodulator 50. The demodulator 50 includes two multipliers MPL1 and MPL2 and two low pass filters LPF1 and LPF2, which will be described later. The signal detector 20 is a kind of signal pre-processing unit and extracts a composite signal on which two information signals are loaded, from a variation in current caused by a thermal resistance and an electric field resistance in the resistive probe 30. A modulator 40 for modulating a variation in current caused by charge polarization of the ferroelectric recording layer 2 of the media 10, that is, the electric field signal, is connected to the resistive probe 30. The modulator 40 generates a sinusoidal wave having a predetermined frequency and forms a modulation electric field in a channel region of the semiconductor tip 31. The electric field signal is modulated by the modulation electric field. A resistance variation (thermal signal) occurs in the resistive probe 30 due to a temperature variation of the resistive probe 30 generated by the physical recording layer 3 of the media 10 in which the pit 3' is formed.

The signal detector 20 detects a composite signal including the electric field signal modulated from the resistive probe 30 and the thermal signal and allows the composite signal to pass to the demodulator 50. The electric field signal modulated by the modulator 40 and the thermal signal are separated from each other and are demodulated in the demodulator 50. That is, according to an exemplary embodiment of the present invention, the electric field signal is modulated by a high frequency modulation signal in the modulator 40 and the thermal signal generated by the thermal resistance variation is not modulated so that the electric field signal and the thermal signal can be separated into an electric field signal output VFO and a thermal signal output VTO in the demodulator 50.

Separation of the electric field signal and the thermal signal, that is, modulation and demodulation of an information signal, will be described in detail later. A bias voltage $V_{ss}$ is applied to the signal detector 20 so that a driving voltage can be applied to the resistive probe 30. The bias voltage can be directly applied to the resistive probe 30 without passing through the signal detector 20. The bias voltage is needed when a field effect semiconductor probe operates as a probe for reading information written on recording medium.

The above-described structure shown in FIG. 2A shows functionally-separated elements of the apparatus for reproducing information according to an exemplary embodiment of the present invention. The functions are combined according to a design and an additional function may be included in the apparatus for reproducing information according to an exemplary embodiment of the present invention.

A related art field effect transistor type probe is used as the resistive probe 30. For example, a scanning probe having a field effect transistor channel disclosed in U.S. Pat. No. 6,521,921 or a semiconductor probe with a resistive tip disclosed in U.S. Patent Application Publication No. 20050231225 A1 may be used as the resistive probe 30.

Figure 2B:
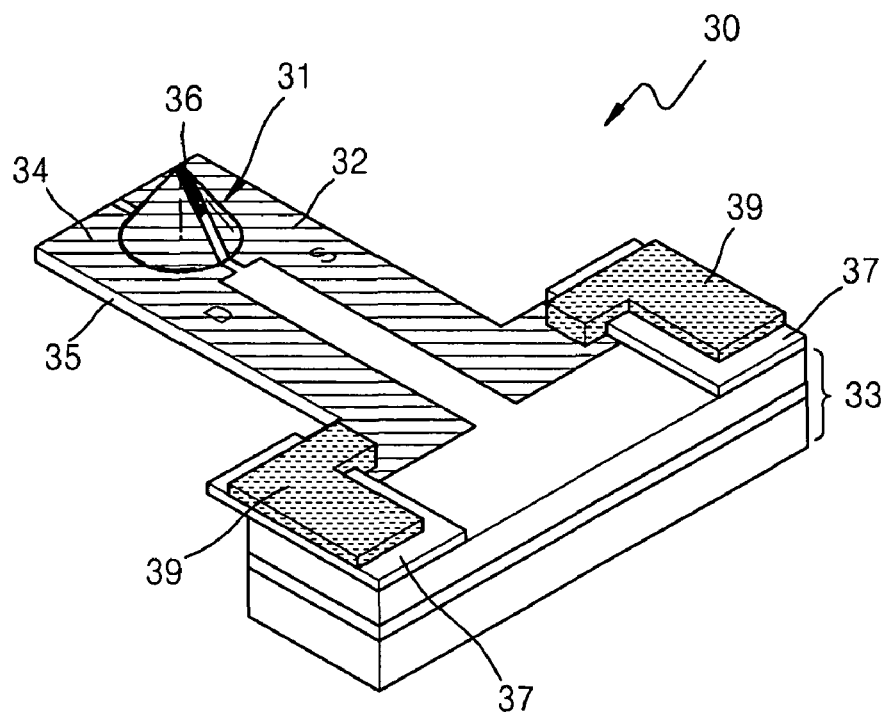
FIG. 2B is a schematic diagram of a field effect semiconductor probe used in the apparatus illustrated in FIG. 2A.

A structure in which a modulation field can be formed in a semiconductor tip is needed so that the same kinds of different probes, as well as the above two kinds of related art probes, can be used in the apparatus and method for reproducing information according to an exemplary embodiment of the present invention. Most field effect semiconductor probes satisfy this condition. As an element for forming an electric field in a channel region of a structure for forming a modulation field, a substrate for forming the modulation field in the channel region or an electrode formed separately from the substrate can be used, and a modulation signal having a predetermined frequency can be applied to the electrode. The electrode (hereinafter, referred to as a modulation electrode) to which the modulation signal is applied may be disposed on a rear surface of the substrate having a semiconductor tip or at one side of a cantilever, as illustrated in FIG. 2B. If the modulation signal is applied to the modulation electrode, and as a depletion layer is formed in the channel region, an electrode channel is formed. The size of the electrode channel, that is, the amount of current, varies according to the strength of the modulation signal.

Figure 2C:
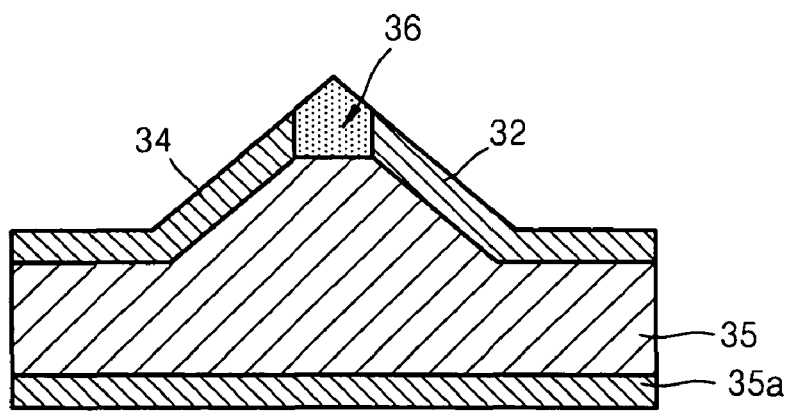
FIG. 2C illustrates a lateral cross-sectional of a tip of the probe of FIG. 2B.

FIG. 2B is a perspective view of a probe which is one kind of probe used in an exemplary embodiment of the present invention and is disclosed in U.S. Patent Application Publication No. 2005/0231225 A1, and FIG. 2C is a cross-sectional view of a tip of the probe of FIG. 2B.

Referring to FIG. 2B, an insulating layer 37 is disposed on a silicon substrate 33, and an electrode 39 is formed on the insulating layer 37. A cantilever 35 extends from the surface of the substrate 33, and a semiconductor tip 31 having a source and a drain, and a channel region between the source and the drain is disposed on a front end of the cantilever 35. Source and drain electrodes 32 and 34 each electrically contacting the source and drain of a transistor, respectively, are formed on a slanting surface of the semiconductor tip 31. Second impurities are doped into a tip of the semiconductor tip 31 such that a resistive channel region 36 having electron mobility is formed. The source and drain electrodes 32 and 34 are respectively connected to two pads 39 via the cantilever 35. As described above, the channel region 36 is formed only by an electric field or by lightly doping impurities so that electron mobility can be provided even without an electric field present. Here, a modulation signal generator 41 which is one element of the modulator 40 may be connected to the substrate 33. In order to more effectively apply a modulation signal $V_{sub}$ to the semiconductor tip 31, a modulation electrode 35a may be formed on one side of the cantilever 35 which extends from the substrate 33, as illustrated in FIG. 2C. Thus, it may be understood that the modulator 40 includes the modulation electrode 35a. This is because signal modulation is performed in the semiconductor tip 31 of the resistive probe 30 and a part of the function of the resistive probe 30 is included in the modulator 40. The structure and operation of the resistive semiconductor tip may be sufficiently understood with reference to U.S. Patent Application Publication No. 20050231225 A1.

Figure 3A:
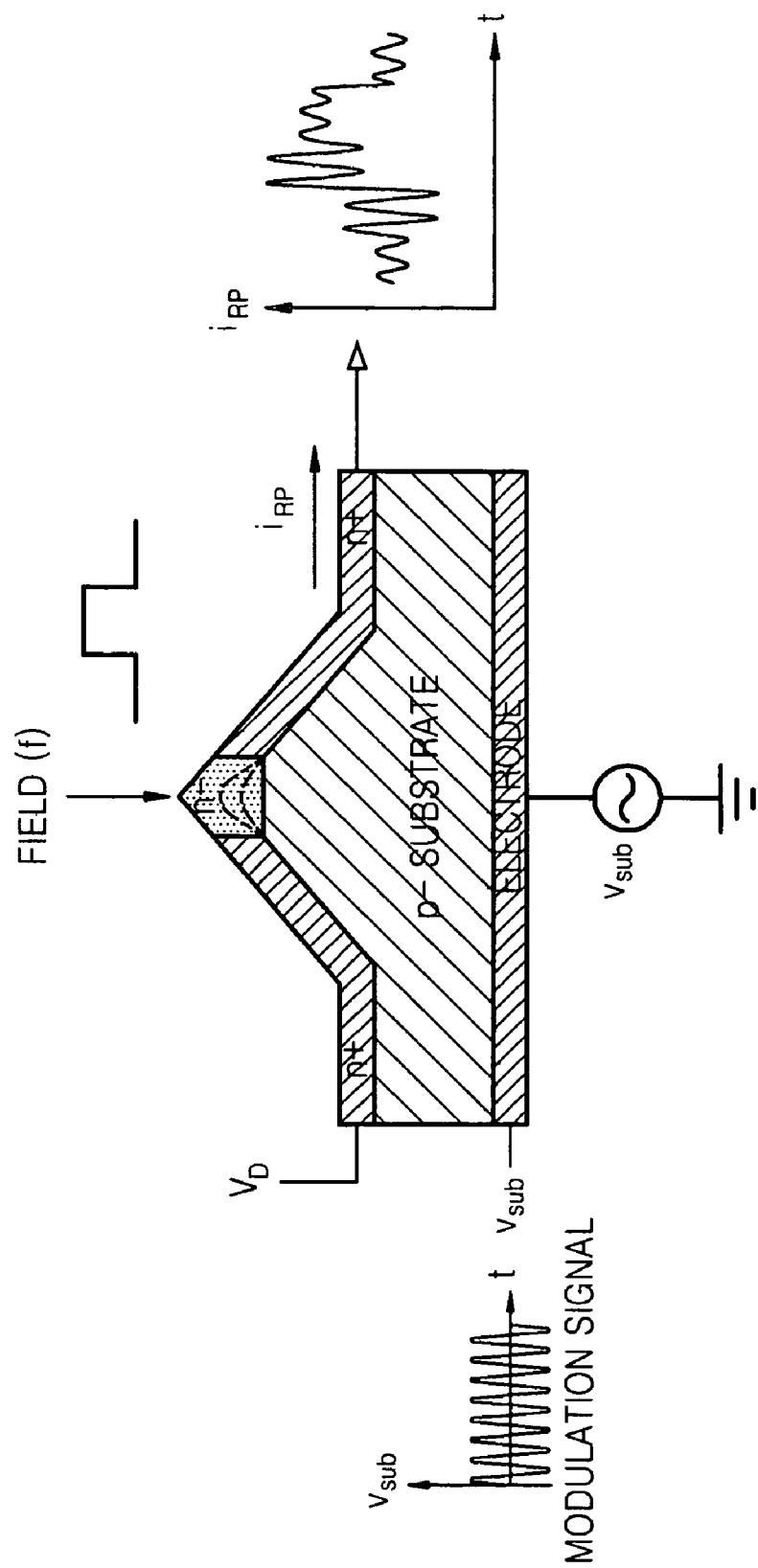
FIG. 3A illustrates modulation of an electric field signal in a resistive semiconductor tip during an information reading operation.
Figure 3B:
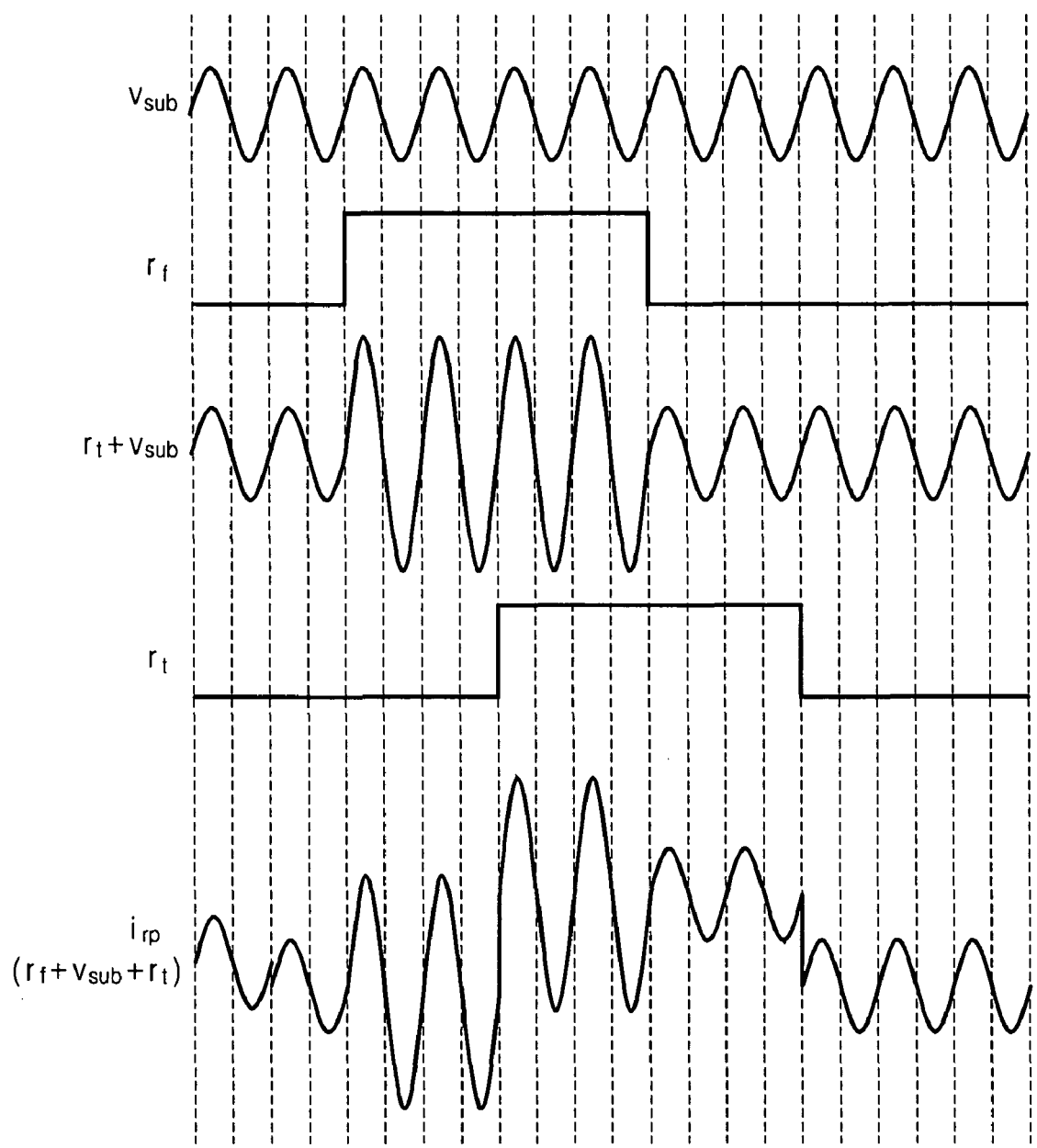
FIG. 3B is a waveform diagram of a modulation signal.

FIG. 3A illustrates modulation of an electric field signal in a resistive semiconductor tip during an information reading operation, and FIG. 3B is a waveform diagram illustrating a modulation signal $V_{sub}$ having a frequency $\omega$, a resistive component $r_f$ which varies according to a resistance $r_f$ which varies according to an electric field variation without the modulation signal $V_{sub}$, a resistive component $r_f + V_{sub}$ which varies according to a resistance $r_f$ which varies according to an electric field variation modulated by the modulation signal $V_{sub}$, a resistive component $r_t$ which varies according to a thermal resistance $r_t$ which varies according to a thermal variation, and an output $V_o$ which varies according to the entire resistance of a resistive probe. That is, FIG. 3B is a comparison waveform diagram illustrating the relationship between the electric field resistance signal $r_f$, the thermal signal $r_t$, the modulation signal $V_{sub}$, the modulated electric field signal $r_f + V_{sub}$, and an output $V_o$, $i_{rp} = r_f + V_{sub} + r_t$ which includes all synthesized components.

Referring to FIG. 3A, a p-layer is formed on a substrate, an n-type source and drain are formed on the surface of the p-layer, and a lightly-doped n-channel region is formed between the n-type source and drain. A modulation signal $V_{sub}$ which is a sinusoidal wave having a predetermined frequency is applied to the substrate, and a variation in electron mobility caused by the sinusoidal wave occurs in the channel region. If an electric field is applied to the substrate from media, the electric field from the media is applied to the channel region and a width of electron mobility of the channel region in which electron mobility varies according to the sinusoidal wave expands. That is, electron mobility caused by the electric field is amplified by the sinusoidal wave such that a modulated component $r_{f\omega}$ is obtained. Due to a variation in heat dissipation generated by a pit, the thermal signal $r_t$ is also added to the modulated signal and a final resistance of the probe is obtained. In this case, only a signal caused by the electric field is modulated, and the modulation signal $V_{sub}$ does not affect a variation in electron mobility generated by the above-described thermal variation, that is, a variation in a thermal resistance and a corresponding variation in current.

The apparatus and method for reproducing information will now be described with reference to FIG. 4.

Figure 4:
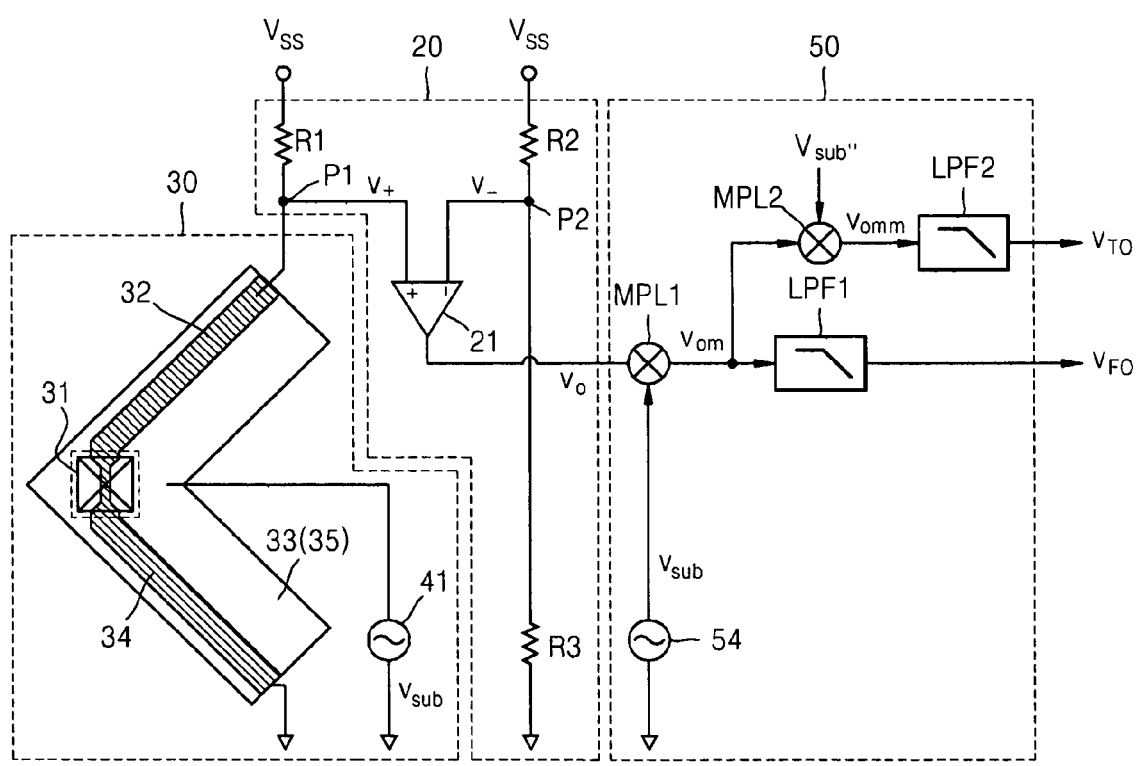
FIG. 4 is a schematic circuit diagram of the apparatus for reproducing information according to an exemplary embodiment of the present invention.

FIG. 4 is a schematic circuit diagram of the apparatus for reproducing information according to an exemplary embodiment of the present invention. In the apparatus for reproducing information shown in FIG. 4, a modulation signal $V_{sub}$ is detected by a Wheatstone bridge having two branches. In the drawing, a left branch includes a resistive semiconductor tip 31 and a first resistor R1, which are serially connected to each other, and a right branch includes a second resistor R2 and a third resistor R3. A drain electrode 34 is grounded and is connected to the resistive semiconductor tip 31 which is formed at a tip of a resistive probe 30, and a source electrode 32 is connected to the first resistor R1. The right branch includes the second resistor R2 and the third resistor R3 which are serially connected to each other, and the third resistor R3 is grounded. A bias voltage $V_{ss}$ is commonly applied to the left branch and the right branch of the Wheatstone bridge.

A modulation voltage or a modulation signal $V_{sub}$ is applied by a modulation signal generator 41 to a substrate 33, preferably, to a modulation electrode 35a. A node P1 between the first resistor R1 and the source electrode 32 and a node P2 between the second resistor R2 and the third resistor R3 are connected to a non-inversion (+) input terminal and an inversion (−) input terminal of a differential amplifier 21, respectively. An output terminal of the differential amplifier 21 is connected to a demodulator 50. The demodulator 50 outputs a information signals finally obtained using multipliers (MPL1 and MPL2) and filters, for example, low pass filters (LPF1 and LPF2).

The resistive semiconductor tip 31 of the resistive probe 30 is affected by an electric field generated by media so that electron mobility, that is, an electrical resistance, of the resistive semiconductor tip 31 varies. An interval between the semiconductor tip 31 and the media varies according to a surface roughness of the media. As such, the amount of heat dissipation varies and a variation in electron mobility causes a variation in resistance. Thus, a total resistance $r_{RP}$ of the resistive probe 30 is determined by the sum of an intrinsic resistance component $R_o$ of the semiconductor tip 31, a resistance component $r_f$ which varies according to a variation in an electric field from the media and a resistance component $r_t$ caused by thermal instability. The first resistor R1 has a value $R_o$ like the intrinsic resistance component, the second resistor R2 has the same value as that of the third resistor R3, and the modulation signal $V_{sub}$ is a sinusoidal wave having a predetermined frequency $\omega$. Here, a voltage $V_{sub}$ of the modulation signal is obtained using equation 2:

$$V_{sub} = V_{sub} \sin \omega t \quad (2)$$

In this case, a node voltage $v_+$ of the Wheatstone bridge is obtained using equation 3:

$$V_+ = \frac{R_o + r_f^\omega + r_t}{2R_o + r_f^\omega + r_t} V_{ss} \quad (3)$$

$$\approx \frac{R_o + r_f^\omega + r_t}{2R_o} V_{ss},$$

where a superscript $\omega$ of the resistance component $r_f$ which varies according to an electric field indicates that the resistance component $r_f$ is modulated for a frequency $\omega$ of the modulation voltage $V_{sub}$. One branch of the Wheatstone bridge is formed by the second and third resistors R2 and R3 so as to remove an offset voltage. A node voltage $v_-$ of the branch is obtained using equation 4:

$$V_- = \frac{V_{ss}}{2} \quad (4)$$

When the node voltages $v_+$ and $v_-$ of the Wheatstone bridge are amplified by the differential amplifier 21 having a gain A, an output voltage $V_o$ is obtained using equation 5:

$$V_o = A(v_+ - v_-) \quad (5)$$

$$= \frac{r_f^\omega + r_t}{2R_o} A \cdot V_{ss}$$

The demodulator 50 is used to obtain the resistance component $r_f$ which varies according to an electric field from the output voltage $V_o$. The demodulator 50 includes a first multiplier MPL1 and a first low pass filter LPF1 and a second multiplier MPL2 and a second low pass filter LPF2, like in the above-described exemplary embodiment. By multiplying an output voltage $V_o$ of the differential amplifier 21 by a demodulation signal $V_{sub'}$ having the same frequency as the modulation signal $V_{sub}$ and the same phase as the output voltage $V_o$ using the first multiplier MPL1, an output voltage $V_{om}$ in the following equation 6A is obtained:

$$v_{om} = v_o \times v_{sub} \quad (6A)$$

$$= \frac{1}{2R_o} A V_{ss} V_{sub} \left( \frac{r_f^o + r_f^{2\omega}}{2} + r_t^\omega \right),$$

where superscripts o, $\omega$ and 2$\omega$ of each resistance component denote frequency components.

Thus, by detecting only a DC component using the first low pass filter LPF1, only a resistance component $r_f$ which varies according to an electric field can be detected.

By multiplying the output voltage $V_{om}$ and a demodulation signal $V_{sub''}$ having the same phase as that of the output voltage $V_{om}$ using the second multiplier MPL2, the following output voltage $V_{omm}$ in the following equation 6B is obtained:

$$v_{omm} = v_{om} \times v_{sub} \quad (6B)$$

$$= \frac{1}{2R_o} A V_{ss} V_{sub}^2 \left( \frac{r_t^0 + r_t^{2\omega}}{2} + \frac{3r_f^\omega + r_f^{3\omega}}{4} \right),$$

where superscripts o, $\omega$, 2$\omega$ and 3$\omega$ of each resistance component denote frequency components. The output voltage $V_{omm}$ passes through the second low pass filter LPF2 so that only the resistance component $r_t$ which varies according to a thermal signal can be detected.

An apparatus and a method for reproducing information according to another exemplary embodiment of the present invention will now be described.

Figure 5:
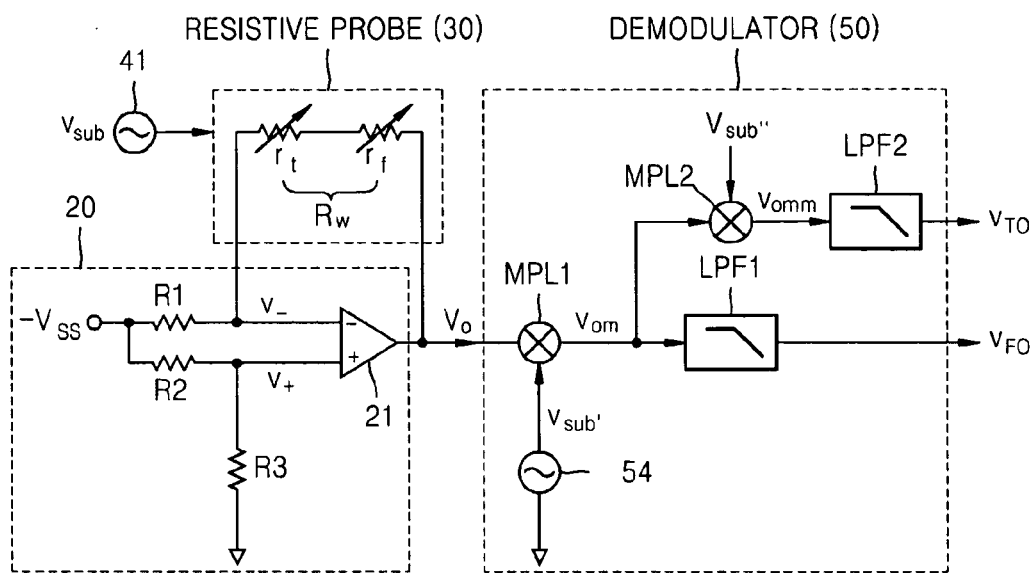
FIG. 5 is a schematic circuit diagram of the apparatus for reproducing information according to another exemplary embodiment of the present invention.

FIG. 5 is a schematic circuit diagram of the apparatus for reproducing information according to another exemplary embodiment of the present invention. Referring to FIG. 5, the resistive probe 31 is connected to an output terminal of an operational amplifier 21, and a drain electrode 34 of the resistive probe 31 is connected to an inversion input terminal (−) of the operational amplifier 21. The first and second resistors R1 and R2 are connected to the inversion input terminal (−) and a non-inversion input terminal (+) of the operational amplifier 21, respectively, and a bias voltage $V_{ss}$ is commonly applied thereto. In addition, the third resistor R3 which, in combination with the second resistor R2, constitutes a voltage distributor is further connected to the non-inversion input terminal of the operational amplifier 21. An output terminal of the operational amplifier 21 is connected to the demodulator 50. The demodulator 50 includes the first and second multipliers MPL1 and MPL2 and the first and second low pass filters LPF1 and LPF2, as described above.

As described above, a total resistance $R_w$ of the semiconductor tip 31 is determined by the sum of an intrinsic resistance $R_o$, a resistance component $r_f$ which varies according to an electric field and a resistance component $r_t$ caused by a thermal variation. The first resistor R1 has the same value as that of the nominal resistance Ro of the semiconductor tip 31. A modulation signal or modulation voltage $V_{sub}$ which is a sinusoidal wave having a predetermined frequency $\omega$ can be expressed in the substrate 33 or a modulation electrode 33a using equation 7:

$$v_{sub} = V_{sub} \sin \omega t \quad (7)$$

where voltages $V_+$ and $V_-$ applied to the non-inversion input terminal and the inversion input terminal, respectively, are obtained using equation 8:

$$V_+ = -\frac{V_{ss}}{2} \quad (8)$$

$$V_- = -\frac{V_{ss}}{2} \quad (9)$$

Since an impedance at the non-inversion input terminal is effectively infinite, a current is obtained using equation 9:

$$\frac{V_{ss} - v_-}{R_o} + \frac{v_o - v_-}{R_o + r_f^\omega + r_t} = 0 \quad (10)$$

In this case, an output voltage of the operational amplifier 21 is obtained using equation 11:

$$v_o = \frac{r_f^\omega + r_t}{2R_o} V_{ss}, \quad (11)$$

where a superscript of the resistance component $r_f$ which varies according to an electric field indicates that the resistance component $r_f$ is modulated for a frequency $\omega$ of the modulation voltage $V_{sub}$. The resistance component $r_f$ which varies according to an electric field from the above voltage is obtained from the demodulator 50. The demodulator 50 includes a multiplier 51 and a low pass filter 52. By multiplying an output voltage $V_o$ of the operational amplifier 21 by the modulation voltage $v_{sub}$ using a multiplier, an output voltage $v_{om}$ can be obtained using equation 12A:

$$v_{om} = v_o \times v_{sub} \quad (12A)$$

$$= \frac{1}{2R_o} V_{ss} V_{sub} \left( \frac{r_f^o + r_f^{2\omega}}{2} + r_t^\omega \right),$$

where superscripts o, $\omega$ and 2$\omega$ of each resistance component denote frequency components. Thus, by filtering the output voltage $V_{om}$ using the low pass filter 52, only the resistance component $r_f$ which varies according to an electric field can be detected.

By multiplying the output voltage $V_{om}$ of the first multiplier MPL1 and the modulation voltage $v_{sub}$, using the second multiplier MPL2, an output voltage $V_{omm}$ can be obtained using equation 12B, and by filtering the output voltage $V_{omm}$ using the second low pass filter MPL2, only the resistance component $r_t$ which varies with temperature can be detected.

$$v_{omm} = v_{om} \times v_{sub} \quad (12B)$$

$$= \frac{1}{2R_o} A V_{ss} V_{sub}^2 \left( \frac{r_t^0 + r_t^{2\omega}}{2} + \frac{3r_f^\omega + r_f^{3\omega}}{4} \right),$$

where superscripts o, $\omega$, 2$\omega$ and 3$\omega$ of each resistance component denote frequency components.

As described above, according to an exemplary embodiment of the present invention, a modulation signal having a predetermined frequency is applied only to a signal which varies according to an electric field of a composite signal including a signal generated by a thermal variation and the signal which varies according to an electric field, therefore, by demodulating the composite signal a thermal signal and an electric field signal can be separated from each other.

Figure 6:
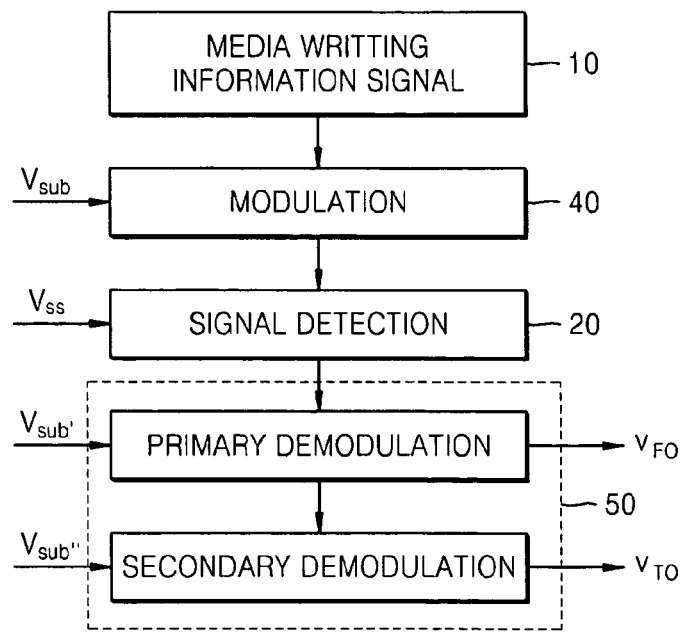
FIG. 6 is a schematic diagram illustrating a method of reproducing information using a semiconductor probe according to an exemplary embodiment of the present invention.

FIG. 6 is a schematic diagram illustrating a method of reproducing information using a semiconductor probe according to an exemplary embodiment of the present invention.

An electric field is generated by charges or a dipole moment trapped on the surface of information media. A channel region of the semiconductor probe varies according to the electric field so that the resistance of a resistive probe 30 varies. A signal to be generated by applying a driving voltage to the resistive probe 30 can be classified into an intrinsic resistance component of the resistive probe 30, a resistance component which varies according to the electric field and a thermal resistance variation component generated by a temperature variation generated due to a variation in the shape of a physical recording layer.

In operation 40 (modulation), a modulation field is formed by applying a high frequency modulation signal $v_{sub}$ to the semiconductor probe 30 and only a resistance component signal which varies according to the electric field is modulated.

In operation 20 (signal detection), the signal to be detected by applying the driving voltage to the semiconductor probe 30 may be expressed by a signal modulated by the modulation signal, that is, by the sum of a modulated resistance component signal which varies according to an electric field and a signal including an intrinsic resistance component and a thermal resistance variation component of the semiconductor probe.

In operation 20 (signal detection), a voltage distributor to distribute a bias voltage $V_{ss}$ to the semiconductor probe and to extract a signal generated in the semiconductor probe may be constituted. A bridge circuit or an operational amplifier having a feedback loop may be used as the voltage distributor. In this case, operation 20 may further include removing an offset voltage generated during voltage distribution and amplifying a detection signal. A detailed description thereof has been already detailed above.

Operation 50 (demodulation) includes separating a signal modulated by the modulation field and a non-modulated signal from the signal detected in operation 20 and extracting two signals. In detail, operation 50 includes multiplying the signal detected in operation 20 by a demodulation signal twice and extracting two signals having smaller frequencies than a predetermined frequency by filtering two signals output in the multiplying of the two separated signals. The demodulation signals $V_{sub'}$ and $V_{sub''}$ have the same frequencies as those of the modulation signals and have substantially the same phases as those of the signals detected in operation 20. A detailed description thereof also has been already described above with reference to FIGS. 4 through 7.

Figure 7:
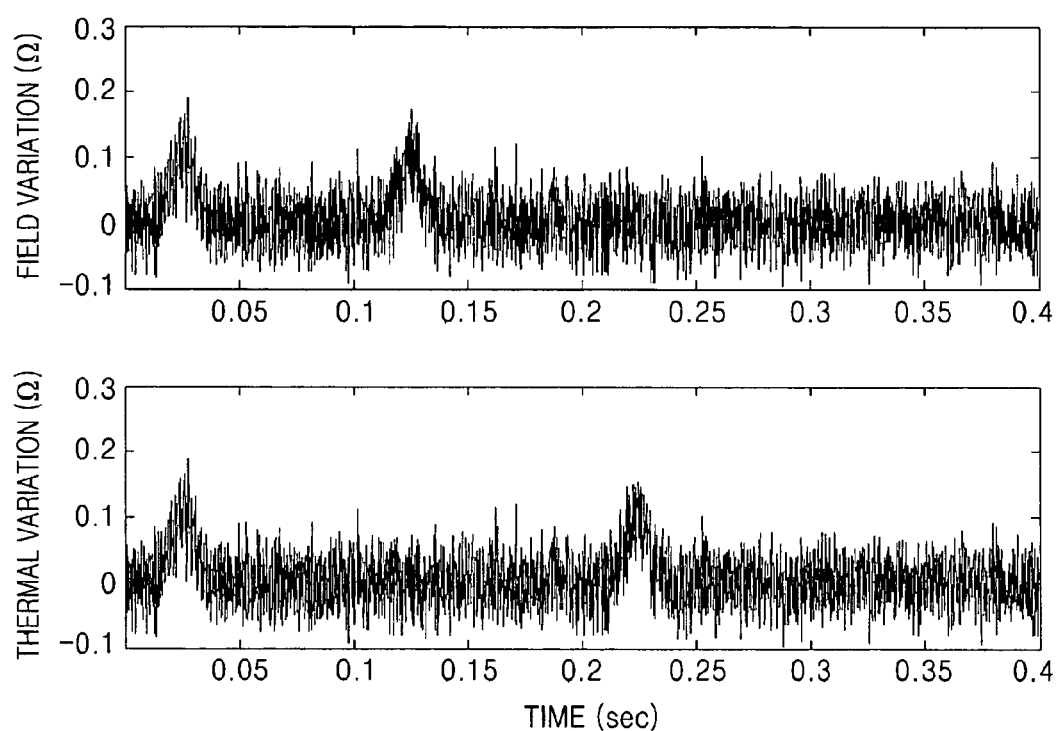
FIGS. 7 through 9 respectively show simulation results of the exemplary embodiment illustrated in FIG. 5.
Figure 8:
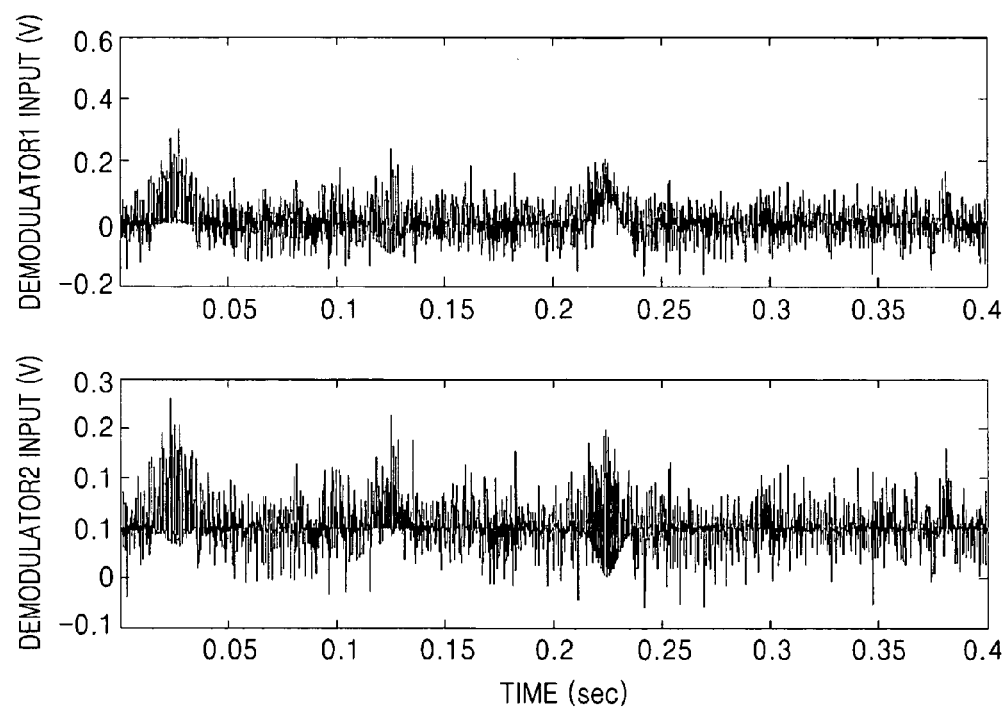
Figure 9:
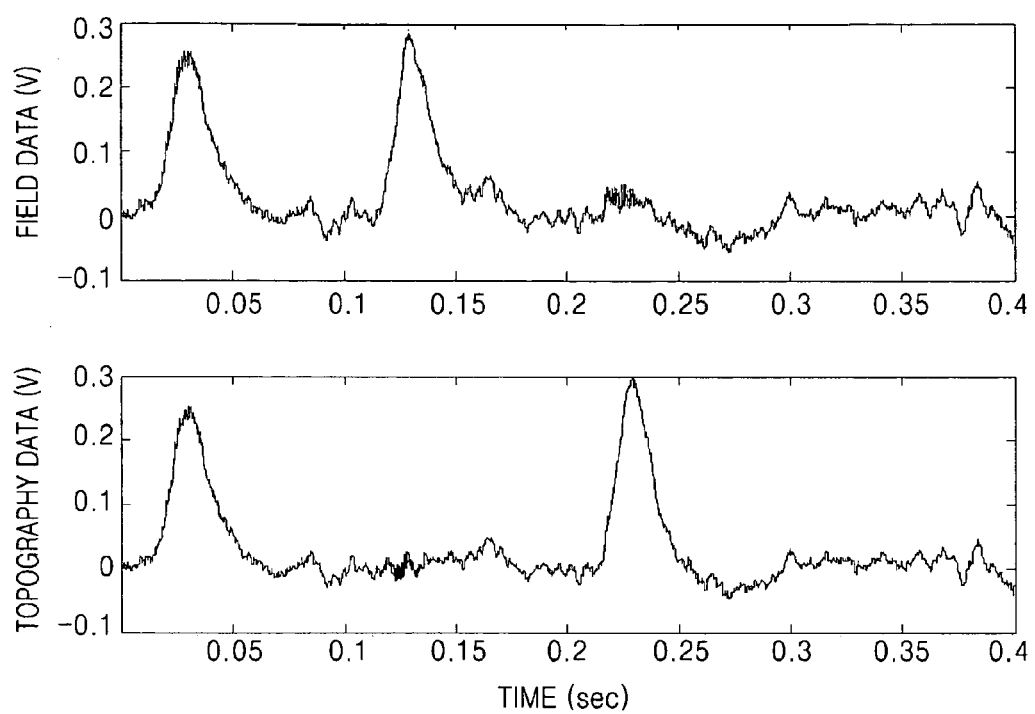

FIGS. 7 through 9 respectively show simulation results for the exemplary embodiment illustrated in FIG. 5.

Referring to FIG. 7, a first waveform is a waveform of a resistance component $r_f$ which varies according to an electric field, and a second waveform is a waveform of a resistance component $r_t$ caused by a thermal variation, that is, data used in simulation.

Referring to FIG. 8, a first waveform is an output waveform of a primary signal which has passed through a first multiplier, and a second waveform is an output waveform of a secondary signal which has passed through a second multiplier.

Referring to FIG. 9, the upper part of the drawing is a waveform of a signal VFO obtained by filtering a primary signal, and the lower part of the drawing is a waveform of a signal VTO obtained by filtering a secondary signal.

In the above simulation data, an input waveform of FIG. 7 and an output waveform of FIG. 9 coincide with each other. Thus, respective signals can be successively separated from a composite signal including a thermal signal and an electric field signal using the apparatus for reproducing information using a semiconductor probe according to an exemplary embodiment of the present invention.

Another aspect of an exemplary embodiment of the present invention is to provide information media capable of a double-layered bit storage and an apparatus using the same. A polymer is coated on a ferroelectric recording layer so that a surface roughness of the ferroelectric recording layer is improved and a signal noise caused by surface roughness in the related art is completely removed. In addition, the polymer is used as a physical recording layer on which information is written by varying the shape of the physical recording layer and thus also serves as a charge injecting layer with respect to the ferroelectric recording layer disposed below the physical recording layer. According to the exemplary embodiment of the present invention, a double-layered recording media is formed so that a recording density can be maximized.

In addition, a storage media in which information can be stored by arranging the polarization in a ferroelectric layer disposed below the physical recording layer is provided and information can be written and reproduced on and from the media so that a resistive probe recording technology and a thermal probe recording technology can be simultaneously implemented. In addition, the roughness of the surface of the media is removed such that noise generated by a surface roughness is removed. In addition, two recording layers having different information storage forms are integrated on one media such that information can be densely stored.

In addition, the present invention can be used in a variety of fields in which a field effect transistor probe is used, and in particular, in the field of information reproduction.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An information storage media comprising:
   a substrate;
   a ferroelectric recording layer which stores information by arranging a polarization direction of polarization domains of the ferroelectric recording layer, and which is formed on the substrate;
   a physical recording layer disposed on the ferroelectric recording layer and on which information is written by forming pits in the physical recording layer; and
   an electrode positioned between the substrate and the ferroelectric recording layer.

2. The information storage media of claim 1, wherein the electrode is formed of a material selected from the group consisting of Pt, Pd, Ir, Ru, and $RuO_2$.

3. The information storage media of claim 1, wherein the ferroelectric recording layer is formed of a material selected from the group consisting of PZT, $PbTiO_3$, $BiFeO_3$, and $LiTaO_3$.

4. The information storage media of claim 1, wherein the physical recording layer is formed of a material selected from the group consisting of polystyrene benzylcyclobutene (PS-BCB), PCBM [6,6]-phenul C61-butyric acid methyl ester), OC1C10-PPV (poly[2-methoxy-5-(3', 7'-dimethyloctyloxy)]-p-phenylene vinylene), and poly-3-hexylhtiophene (P3HT).

5. An apparatus for reproducing information comprising:
   a storage media comprising a ferroelectric recording layer which stores information by arranging a polarization direction of polarization domains of the ferroelectric recording layer and a physical recording layer disposed on the ferroelectric recording layer and on which information is written by forming pits in the physical recording layer;
   a semiconductor probe which generates a composite signal comprising an electric field signal generated by an electric field variation of the ferroelectric recording layer of the storage media and a thermal signal generated by a temperature variation generated due to a variation in a shape of the physical recording layer;

a signal detector which detects the composite signal generated by the semiconductor probe; and
a demodulator which demodulates the composite signal detected by the signal detector and extracts the electric field signal and the thermal signal from the composite signal.

6. The apparatus of claim 5, further comprising:
a high frequency modulation signal generator; and
an electrode which is disposed on a cantilever and to which a high frequency modulation signal is applied by the high frequency modulation signal generator,
wherein the semiconductor probe comprises:
a tip formed of a p-type semiconductor;
a region on which a channel is to be formed at the point of the tip; and
source and drain regions doped to be an n-type semiconductor on slanting surfaces of either sides of the region on which the channel is to be formed,
wherein the cantilever is disposed on an end of the tip and formed of a p-type semiconductor.

7. The apparatus of claim 6, wherein the high frequency modulation signal comprises a sinusoidal signal.

8. The apparatus of claim 7, wherein the high frequency modulation signal comprises a high frequency signal having a frequency at least 5 times larger than a frequency of an electric field generated in the storage media.

9. The apparatus of claim 5, wherein the demodulator comprises:
a first multiplier, comprising a multiplication operator, which multiplies the composite signal detected by the signal detector by a demodulation signal;
a first low pass filter which extracts an electric field signal having a frequency less than a first predetermined frequency from a primary signal output from the first multiplier;
a second multiplier which multiplies the primary signal by the demodulation signal; and
a second low pass filter which extracts a thermal signal having a frequency less than a second predetermined frequency from a secondary signal output from the second multiplier,
wherein a frequency of the demodulation signal is substantially equal to a frequency of the high frequency modulation signal and has a phase substantially equal to a phase of the composite signal detected by the signal detector.

10. The apparatus of claim 9, wherein a cut-off frequency of the low pass filter is less than 10 times the frequency of the high frequency modulation signal.

11. The apparatus of claim 5, wherein the signal detector is configured as a voltage divider so as to distribute and apply a voltage to the semiconductor probe and to extract a signal.

12. The apparatus of claim 11, wherein the voltage divider is a bridge circuit comprising at least one resistor and the semiconductor probe.

13. The apparatus of claim 7, wherein the demodulator comprises:
a first multiplier, which comprises a multiplication operator and multiplies the composite signal detected by the signal detector by a demodulation signal;
a first low pass filter which extracts an electric field signal having a frequency less than a first predetermined frequency from a primary signal output from the first multiplier;
a second multiplier which multiplies the primary signal by the demodulation signal; and
a second low pass filter which extracts a thermal signal having a frequency less than a second predetermined frequency from a secondary signal output from the second multiplier,
wherein a frequency of the demodulation signal is substantially equal to a frequency of the high frequency modulation signal and has a phase substantially equal to a phase of the composite signal detected by the signal detector.

14. The apparatus of claim 13, wherein the bridge circuit is a half bridge circuit comprising the semiconductor probe and one resistor and a composite signal is detected at a node to which the semiconductor probe is serially connected.

15. The apparatus of claim 13, wherein the bridge circuit is a Wheatstone bridge circuit comprising the semiconductor probe and three resistors and further comprises a differential amplifier, and
wherein one of an inversion input terminal and a non-inversion input terminal of the differential amplifier is connected to a first connection node of a first arm of the Wheatstone bridge comprising the semiconductor probe is included which is connected to a first resistor, the first connection node being disposed between the semiconductor probe and the first resistor, and the other one of the inversion input terminal and the non-inversion input terminal is connected to a second connection node of a first arm of the Wheatstone bridge, the second node being disposed between a second resistor and a third resistor.

16. The apparatus of claim 15, wherein a resistance of the first resistor is substantially equal to a resistance of an intrinsic resistance component of the semiconductor probe and wherein resistances of the second resistor and the third resistor are substantially equal.

17. The apparatus of claim 16, wherein the demodulator comprises:
a multiplier which multiplies the composite signal detected by the signal detector by the demodulation signal; and
a low pass filter which extracts a signal having a lower frequency than a predetermined frequency from the signal output from the multiplier,
wherein the demodulation signal has a frequency substantially equal to a frequency of the high frequency modulation signal and has substantially a same phase as the composite signal output from the signal detector.

18. The apparatus of claim 11, wherein the voltage divider is an inversion amplifier comprising at least one resistor and an operational amplifier in which a feedback loop is formed using the semiconductor probe.

19. A method of reproducing information written on storage media using a semiconductor probe comprising a storage media comprising a ferroelectric recording layer in which information is stored by arranging a polarization direction of polarization domains of the ferroelectric recording layer and a physical recording layer disposed on the ferroelectric recording layer and on which information is written by forming pits in the physical recording layer and a semiconductor tip detecting information from the first and second recording layers of the media, the method comprising:
modulating an electric field signal generated by an electric field variation of the ferroelectric recording layer of the storage media by applying a high frequency modulation signal to the semiconductor probe and by forming a modulation field;
detecting a composite signal corresponding to the information from the semiconductor probe; and demodulating the modulated electric field signal and a non-modulated thermal signal by separating the modulated electric field signal and the non-modulated thermal signal from each other and by extracting two signals.

20. The method of claim 19, wherein the demodulating comprises:

multiplying the detected composite signal by a demodulation signal;

extracting an electric field signal having a frequency less than a first predetermined frequency from a primary signal output from the multiplying of the composite signal;

multiplying the primary signal by the demodulation signal; and extracting a thermal signal having a frequency less than a second predetermined frequency from a secondary signal output from the multiplying of the primary signal.

21. The method of claim 19, wherein the detecting comprises distributing a voltage to the semiconductor probe and extracting a signal generated in the semiconductor probe.

22. The method of claim 20, wherein the detecting further comprises removing and amplifying an offset voltage of the distributed voltage.

* * * * *